(12) United States Patent
Becker et al.

(10) Patent No.: US 11,125,548 B2
(45) Date of Patent: Sep. 21, 2021

(54) POSITION-MEASURING DEVICE

(71) Applicant: DR. JOHANNES HEIDENHAIN GmbH, Traunreut (DE)

(72) Inventors: Thomas Becker, Traunreut (DE); Josef Mitterleitner, Chieming (DE); Wolfgang Pucher, Traunstein/Rettenbach (DE)

(73) Assignee: DR. JOHANNES HEIDENHAIN GmbH, Traunreut (DE)

( * ) Notice: Subject to any disclaimer, the term of this patent is extended or adjusted under 35 U.S.C. 154(b) by 0 days.

(21) Appl. No.: 16/912,721

(22) Filed: Jun. 26, 2020

(65) Prior Publication Data
US 2021/0010801 A1 Jan. 14, 2021

(30) Foreign Application Priority Data

Jul. 8, 2019 (DE) .................. 10 2019 210 023.6

(51) Int. Cl.
*G01B 11/00* (2006.01)
*G01D 5/244* (2006.01)
(Continued)

(52) U.S. Cl.
CPC ............ *G01B 11/005* (2013.01); *G01B 21/04* (2013.01); *G01D 5/24438* (2013.01); *G01D 5/34746* (2013.01); *G01D 2205/95* (2021.05)

(58) Field of Classification Search
CPC .. G01B 11/005; G01B 21/04; G01D 2205/95; G01D 5/24438; G01D 5/34746; G01D 5/34715; B23Q 17/00
See application file for complete search history.

(56) References Cited

U.S. PATENT DOCUMENTS 4,932,131 A * 6/1990 McMurtry ........... G01B 5/0009
33/1 M
10,447,885 B2 * 10/2019 Netsu ..................... H04N 1/03
(Continued)

FOREIGN PATENT DOCUMENTS

DE      102005023984 A1    11/2006
DE      102008010284 A1     8/2009
(Continued)

*Primary Examiner* — Seung C Sohn
(74) *Attorney, Agent, or Firm* — Leydig, Voit & Mayer, Ltd.

(57) ABSTRACT

A position-measuring device includes a carrier body and scanning units movable relative thereto. At least three surfaces of the carrier body each carry a first and second measuring graduation, each having a series of graduation lines. Each of the measuring graduations is associated with a scanning unit for scanning the respective measuring graduation at a scanning location such that, for each surface, two scanning units are disposed for scanning the respective measuring graduations. In each case, these two scanning units are disposed in such a way, and the graduation lines of the two measuring graduations are inclined with respect to each other in such a way, that two normal planes extending respectively in the direction of the respective graduation lines through the respective scanning locations of the two scanning units have a common axis of intersection, whereby the three resulting axes of intersection extend through a common point.

15 Claims, 5 Drawing Sheets

(51) Int. Cl.
    *G01D 5/347*     (2006.01)
    *G01B 21/04*     (2006.01)

(56) References Cited

U.S. PATENT DOCUMENTS

2018/0328705 A1   11/2018   Bernhard et al.
2019/0078911 A1    3/2019   Tomoyuki et al.

FOREIGN PATENT DOCUMENTS

EP             2003681 A1   12/2008
WO    WO 2017080612 A1    5/2017
WO    WO 2017178224 A1   10/2017

* cited by examiner

POSITION-MEASURING DEVICE

CROSS-REFERENCE TO PRIOR APPLICATION

Priority is claimed to German Patent Application No. DE 10 2019 210 023.6, filed on Jul. 8, 2019, the entire disclosure of which is hereby incorporated by reference herein.

FIELD

The invention relates to a position-measuring device for measuring the relative position of two relatively movable objects in a direction of feed and in other degrees of freedom.

BACKGROUND

WO 2017/080612 A1 describes a position-measuring device for measuring the relative position of two relatively movable objects in a direction of feed and in other degrees of freedom. This position-measuring device includes a prismatic carrier body extending longitudinally in the direction of feed and having a plurality of surfaces, each carrying a measuring graduation, and further includes a scanning assembly which is movable relative thereto and includes a plurality of scanning units for scanning the measuring graduations.

As pointed out in WO 2017/080612 A1, such position-measuring devices are used for measuring errors in coordinate measuring machines. The measurement values so obtained can be used to compensate for errors of the coordinate measuring machine and to calibrate the coordinate measuring machine.

SUMMARY

In an embodiment, the present invention provides a position-measuring device for measuring a relative position of two relatively movable objects in a direction of feed and in other degrees of freedom. The position-measuring device includes a carrier body carrying measuring graduations and extending longitudinally in the direction of feed, and a scanning assembly which is movable relative to the carrier body and includes a plurality of scanning units for scanning the measuring graduations. At least three surfaces of the carrier body each carry a first measuring graduation and a second measuring graduation, each of the first measuring graduations and the second measuring graduations having a series of graduation lines, and the graduation lines of the first measuring graduation being inclined with respect to the graduation lines of the second measuring graduation. Each of the first measuring graduations and each of the second measuring graduations is associated with at least one of the scanning units for scanning the respective measuring graduation at a scanning location such that, for each of the at least three surfaces, at least two of the scanning units are disposed for scanning the respective measuring graduations of the respective one of the surfaces, the at least two of the scanning units being disposed in each case in such a way, and the graduation lines of the two measuring graduations being inclined with respect to one another in each case in such a way, that two normal planes extending respectively in the direction of the respective graduation lines of the measuring graduations through the respective scanning locations of the at least two of the scanning units associated with a respective one of the surfaces have a common axis of intersection, whereby the three resulting axes of intersection extend through a common point.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1:
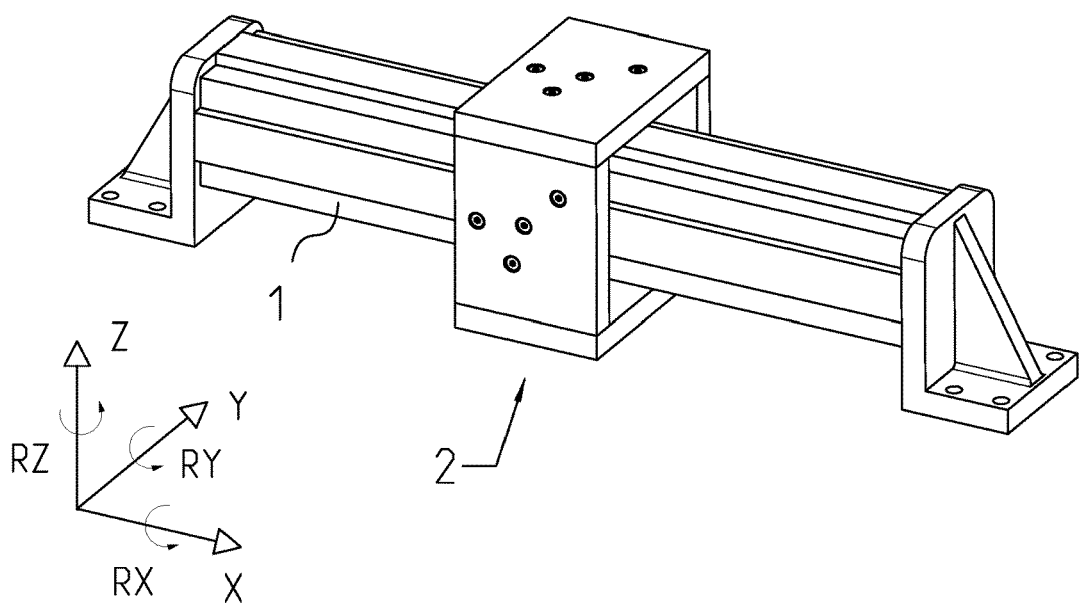
FIG. 1 shows a perspective view of a position-measuring device designed in accordance with a first exemplary embodiment of the present invention and including a carrier body and a scanning assembly.

In an embodiment, the present invention provides a position-measuring device that permits accurate position measurement in the longitudinal direction of a carrier body carrying measuring graduations and in other degrees of freedom.

The position-measuring device is adapted for measuring the relative position of two relatively movable objects in a direction of feed and in other degrees of freedom. It includes a carrier body carrying measuring graduations and extending longitudinally in the direction of feed, and further includes a scanning assembly which is movable relative thereto and includes a plurality of scanning units for scanning the measuring graduations.

The carrier body has a plurality of surfaces extending in the direction of feed. These surfaces lie in different planes. Preferably, the surfaces of the carrier body that carry the measuring graduations are disposed such that the position of the scanning assembly relative to the carrier body can be determined in all six degrees of freedom. For this purpose, the planes of the carrier body defining the surfaces are preferably spatially arranged such that a plurality of intersection lines extending in the direction of feed are formed therebetween.

At least three of these surfaces each carry a first measuring graduation and a second measuring graduation, the first measuring graduation and the second measuring graduation each having a series of graduation lines, and the graduation lines of the first measuring graduation being inclined with respect to the graduation lines of the second measuring graduation. "Inclined" means that the graduation lines of the first measuring graduation have a different direction or orientation than the graduation lines of the second measuring graduation. Thus, the first measuring graduation and the second measuring graduation of one of the surfaces are suitable for determining in-plane degrees of freedom, the reference plane being the respective surface of the carrier body.

Each of the first measuring graduations and each of the second measuring graduations is associated with at least one of the scanning units for scanning the respective measuring graduation at a scanning location such that, for each of the at least three surfaces, at least two of the scanning units are disposed for scanning the respective measuring graduations of the respective one of the surfaces, these at least two scanning units being disposed in such a way, and the graduation lines of the two measuring graduations being inclined with respect to one another in such a way, that two normal planes extending respectively in the direction of the respective graduation lines of the measuring graduations through the scanning locations of the at least two scanning units associated with a respective one of the surfaces have a common axis of intersection, whereby the three resulting axes of intersection extend through a common point. This common point is the thermally neutral point for all scanning units.

The graduation lines may have identical widths along their extent and may also be continuous. However, the graduation lines may also be interrupted along their extent and may also be width-modulated, e.g., in a known manner for filtering harmonics.

Thus, a plane normal to the respective surface extends through the scanning location of the scanning unit associated with the respective measuring graduation on the one hand, and, on the other hand, is oriented in the direction of the graduation lines of this measuring graduation. The extent of the plane in the direction of graduation lines can be equated with the direction perpendicular to the path of the sensitivity vector of the respective measuring graduation. The sensitivity vector of a measuring graduation indicates the direction of movement in which a measurement signal derived therefrom exhibits the fastest variation per unit length traveled. Accordingly, the plane extends in the direction in which a measurement signal derived therefrom exhibits the lowest variation per unit length traveled; i.e., in which the position-dependent modulation is lowest.

Embodiments of the invention increase the measurement accuracy of the position-measuring device and avoid, or at least reduce, temperature-related effects which may corrupt the position measurement.

The surfaces of the carrier body that carry measuring graduations, the measuring graduations, as well as the scanning units are preferably arranged and adapted such that the position of the scanning assembly relative to the carrier body can be determined in all six degrees of freedom.

The carrier body is in particular a prismatic body, where the base defining the prismatic body is a polygon, and the at least three surfaces are the faces of the prismatic body.

Alternatively, the carrier body may be a U-section member, where the surfaces carrying the measuring graduations may be inner surfaces and/or outer surfaces of the U-section member.

For certain applications, it may be advantageous if the measuring graduations and the scanning units are arranged and adapted such that the common thermally neutral point lies at the cross-sectional center of the carrier body.

Advantageously, the first measuring graduation and the second measuring graduation of each surface extend longitudinally along the direction of feed and are disposed adjacent to one another in a direction perpendicular to the direction of feed.

Alternatively, the first and second measuring graduations may also be disposed in mutually overlapping relationship. Such intersecting measuring graduations are also referred to as cross gratings.

It is advantageous if the graduation lines of the first measuring graduation are inclined relative to the direction of feed by an angle different from 0°, and if the graduation lines of the second measuring graduation are also inclined relative to the direction of feed by an angle different from 0° The graduation lines of the first measuring graduation and the graduation lines of the second measuring graduation may be inclined relative to the direction of feed by the same angle in terms of absolute magnitude.

A position-measuring device with particularly high resolution is obtained if the measuring graduations are adapted to be optically scannable.

The measuring graduations may be incremental graduations. In this case, a reference mark pattern may be incorporated into each incremental graduation to establish an absolute reference. Alternatively, the measuring graduations may also be absolute graduations, particularly in the form of a pseudo-random code.

With regard to optimizing the heat input, it may be advantageous if each of the carrier body surfaces extending in the direction of feed is associated with the same number of scanning units.

FIGS. 1 through 4 show a first exemplary embodiment of a position-measuring device designed in accordance with the invention. This position-measuring device serves to measure the relative position of two relatively movable objects in a direction of feed X and in other degrees of freedom Y, Z, RX, RY, RZ. The three degrees of freedom X, Y, Z are linear degrees of freedom, and the degrees of freedom RX, RY, RZ are rotational degrees of freedom about the respective linear axes X, Y, Z. The direction of feed X is the main measurement direction, and the other degrees of freedom Y, Z, RX, RY and RZ are deviations at the respective position X, which can be measured by the position-measuring device.

The position measuring device includes a carrier body 1 which extends longitudinally in the direction of feed X and can be mounted to one of the objects to be measured. For this purpose, mounting elements (shown only schematically in FIG. 1) are disposed between carrier body 1 and the object to be measured. It is particularly advantageous if the mounting elements are configured to rigidly secure carrier body 1 to the object to be measured at a single position in the direction of feed X, and to support it at one or more other positions in such a way that it is longitudinally displaceable relative to the object to be measured in the direction of feed X. Temperature-induced changes in length between the object to be measured and carrier body 1 are thereby compensated for without unacceptable constraining forces being exerted on carrier body 1. This longitudinally displaceable mounting may be accomplished in a known manner by means of flexure bearings, for example.

In accordance with an embodiment of the invention, carrier body 1 has at least three surfaces O1, O2, O3 extending in the direction of feed X. Preferably, carrier body 1 takes the form of a prismatic body, whose base forms a closed polygonal chain, and whose faces form the at least three flat surfaces O1, O2, O3. In the simplest case, the closed polygonal chain is a triangle.

Figure 2:
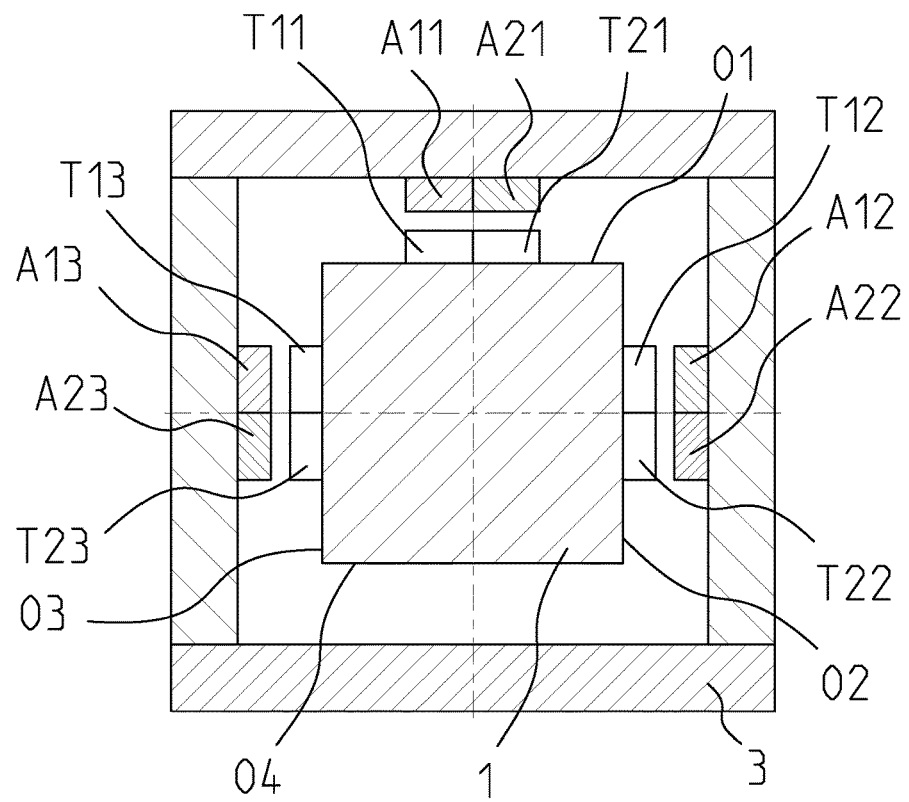
FIG. 2 shows a cross section through the position-measuring device of FIG. 1 in the region of the scanning assembly.

In the exemplary embodiment shown, the polygonal chain forms an equilateral quadrilateral, so that carrier body 1 has the shape of a rectangular parallelepiped having four flat surfaces O1, O2, O3, O4 and having the cross section shown in FIG. 2.

In accordance with an embodiment of the invention, at least three of the surfaces O1, O2, O3, O4 of carrier body 1 each carry a first measuring graduation T11, T12, T13 and a second measuring graduation T21, T22, T23. First measuring graduation T11, T12, T13 and second measuring graduation T21, T22, T23 each have a series of graduation lines, the graduation lines of the respective first measuring graduation T11, T12, T13 and the graduation lines of the respective second measuring graduation T21, T22, T23 being inclined with respect to one another; i.e., forming an angle different from 0°.

Measuring graduations T11 through T13 and T21 through T23 may be adapted to be scannable optically, magnetically, inductively or capacitively. The graduation lines of measuring graduations T11 through T13 and T21 through T23 may be formed directly into surfaces O1 through O3 or applied to surfaces O1 through O3, for example, by magnetization in the case of a magnetically scannable measuring graduation, or by laser ablation in the case of an optically scannable measuring graduation T11 through T13 and T21 through T23. The two measuring graduations associated with a surface O1-O3 may alternatively be applied to a separate carrier which is then attached to this surface O1, O2, O3 of carrier body 1, for example by gluing or by optical contact bonding. In the latter case, it is advantageous if carrier body 1 and the carriers of the measurement graduations are composed of materials having the same coefficient of linear thermal expansion.

If particularly high accuracy is desired for the position measurement, measuring graduations T11 through T13 and T21 through T23 are adapted to be optically scannable. In this case, the series of graduation lines is preferably formed by a sequence of reflective and non-reflective regions.

The position-measuring device further includes a scanning assembly 2 adapted for scanning measuring graduations T11 through T13 and T21 through T23 and movable relative to carrier body 1. Scanning assembly 2 includes a plurality of scanning units A11 through A13 and A21 through A23 and a common support 3, to which scanning units A11 through A13 and A21 through A23 are mounted.

Figure 3:
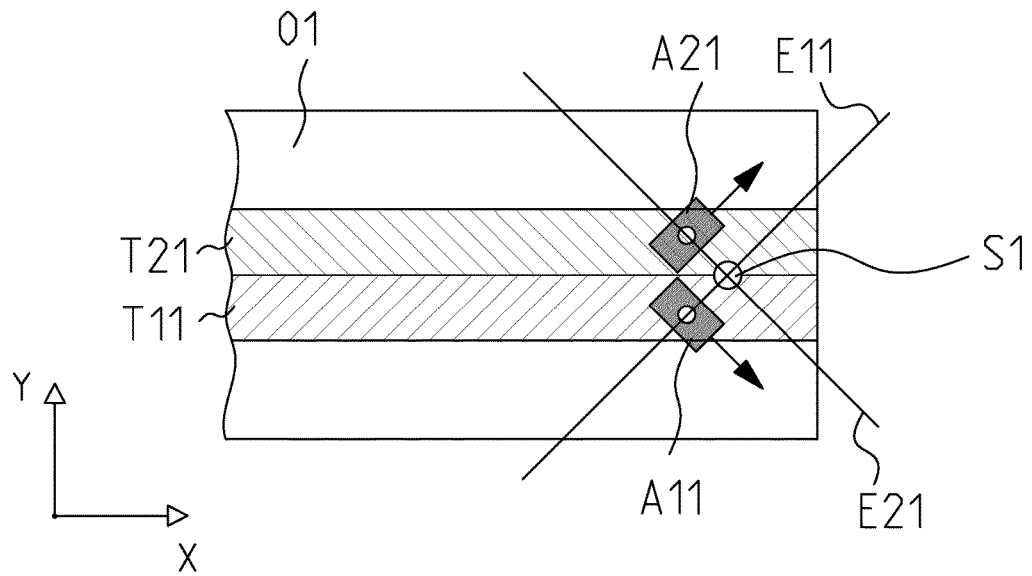
FIG. 3 illustrates the association of two scanning units of the scanning assembly with measuring graduations of a surface of the carrier body.
Figure 4:
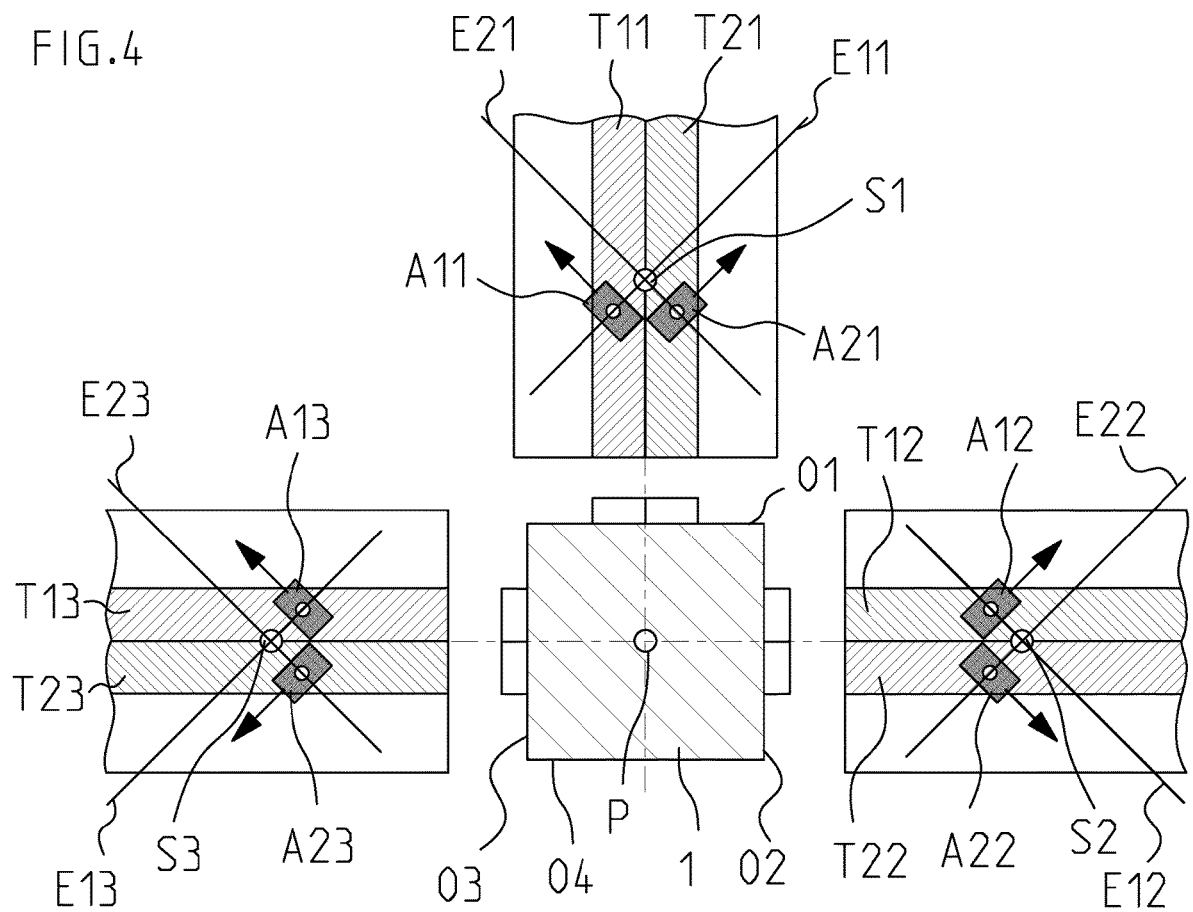
FIG. 4 illustrates the association of all scanning units of the scanning assembly with the measuring graduations of the surfaces of the carrier body.

It is particularly advantageous if the graduation lines of the respective first measuring graduation T11, T12, T13 are disposed at an angle to the direction of feed X; i.e., inclined relative to the direction of feed X by an angle different from 0°, and if the graduation lines of the respective second measuring graduation T21, T22, T23 are also disposed at an angle to the direction of feed X; i.e., also inclined relative to the direction of feed X by an angle different from 0°. This has the advantage that during movement in the direction of feed X, each scanning unit A11 through A13 and A21 through A23 is moved in a directional component of the respective sensitivity vector and thus generates a modulated position-dependent scanning signal. This enables real-time compensation of all scanning signals. In FIGS. 3 and 4, the sensitivity vector of scanning units A11 through A13 and A21 through A23 is indicated by a small arrow at the respective scanning unit A11 through A13 and A21 through A23.

Advantageously, scanning units A11 through A13 and A21 through A23 are configured to generate a plurality of sinusoidal, phase-shifted periodic scanning signals, in particular scanning signals which are phase-shifted by 90° with respect to each other, during scanning of the respective measuring graduation T11 through T13 and T21 through T23 associated therewith.

An inventive arrangement and design according to an embodiment of the invention of measuring graduations T11 through T13 and T21 through T23 and of the scanning units A11 through A13 and A21 through A23 associated therewith will be described in more detail with reference to FIGS. 3 and 4.

In this embodiment, surface O1 carries first measuring graduation T11 and second measuring graduation T21. The graduation lines of first measuring graduation T11 are inclined relative to the direction of feed X, for example by +45°. The graduation lines of second measuring graduation T21 are inclined relative to the graduation lines of first measuring graduation T11, and advantageously also relative to the direction of feed X, for example by −45°. If the graduation lines of first measuring graduation T11 and the graduation lines of second measuring graduation T21 are inclined with respect to the direction of feed X by the same angle in terms of absolute magnitude, then the particular advantage is obtained that identical changes in position will result for the scanning signals generated during scanning.

Surface O2 carries first measuring graduation T12 and second measuring graduation T22. The graduation lines of first measuring graduation T12 are inclined relative to the direction of feed X, for example by +45°. The graduation lines of second measuring graduation T22 are inclined relative to the graduation lines of first measuring graduation T12, and advantageously also relative to the direction of feed X, for example by −45°.

Surface O3 carries first measuring graduation T13 and second measuring graduation T23. The graduation lines of first measuring graduation T13 are inclined relative to the direction of feed X, for example by +45°. The graduation lines of second measuring graduation T23 are inclined relative to the graduation lines of first measuring graduation T13, and advantageously also relative to the direction of feed X, for example by −45°.

Each of first measuring graduations T11, T12, T13 and each of second measuring graduations T21, T22, T23 is associated with at least one scanning unit A11, A12, A13 and A21, A22, A23 to perform scanning at a scanning location. The scanning location is the reference point of the position measurement of the respective scanning unit A11 through A13 and A21 through A23. In FIGS. 3 and 4, the scanning location is symbolized as a bright dot within each of the scanning units A11 through A13 and A21 through A23 depicted in black.

The association of the respective two scanning units A11, A21 and A12, A22 as well as A13, A23 with the respective two measuring graduations T11, T21 and T12, T22 as well as T13, T23 of one of surfaces O1, O2, O3 will be described below in more detail using the example of the two scanning units A11 and A21 with reference to FIG. 3.

If a first plane E11 is passed through the scanning location of scanning unit A11 in the direction of the graduation lines of first measuring graduation T11 and perpendicularly to surface O1, and if a second plane E21 is passed through the scanning location of scanning unit A21 in the direction of the graduation lines of second measuring graduation T21 and perpendicularly to surface O1, then a common axis of intersection S1 is formed between these two planes E11, E21. This axis of intersection S1 forms a thermally neutral axis for the scanning units A11, A21 associated with surface O1. If support 3, and thus scanning assembly 2, expands uniformly from this thermally neutral axis S1, then scanning units A11, A21 move only in the direction of the graduation lines; i.e., perpendicularly to the sensitivity vector of the respective scanning unit A11, A21 and perpendicularly to surface O1. Thus, temperature-induced expansions of carrier body 1 and support 3 will not lead to a measurement error.

The association of all scanning units A11 through A13 and A21 through A23 with measuring graduations T11 through T13 and T21 through T23 is illustrated in FIG. 4. Analogously to the association of scanning units A11 and A21 with measuring graduations T11, T21 described with reference to FIG. 3, scanning units A12, A22 are associated with measuring graduations T12, T22 of surface O2 such that axis of intersection S2 is formed between two planes E12, E22. Correspondingly, scanning units A13, A23 are likewise associated with measuring graduations T13, T23 of surface O3 such that axis of intersection S3 is formed between two planes E13, E23.

In accordance with the invention, in this first embodiment, the at least six scanning units A11 through A13 and A21 through A23 are disposed in such a way, and the graduation lines of the six measuring graduations T11 through T13 and T21 through T23 are oriented in such a way that the three resulting axes of intersection S1, S2, S3 extend through a common point P. This point P is a thermally neutral point (thermal center) of the entire position measuring system. If support 3, and thus scanning assembly 2, expands uniformly from this thermally neutral point P, then scanning units A11 through A13 and A21 through A23 move only in the direction of the respective graduation lines; i.e., perpendicularly to the sensitivity vector of the respective measuring graduation T11 through T13 and T21 through T23, as well as perpendicularly to the respective surfaces O1, O2, O3. Thus, a temperature-induced expansion causes only a displacement in a plane which contains the graduation line and which is perpendicular to the respective surface O1, O2, O3. Therefore, temperature-induced expansions of carrier body 1 and support 3 will not lead to a measurement error. The position-measuring device is invariant to uniform temperature changes, which reduces measurement errors caused by changes in the ambient temperature.

In accordance with an embodiment of the invention, the graduation lines of the two measuring graduations T11 through T13 and T21 through T23 provided on a respective one of surfaces O1, O2, O3 are inclined with respect to one another; i.e. form an angle different from 0°. For example, in the exemplary embodiment described above, they form a respective angle of 90°.

Figure 5:
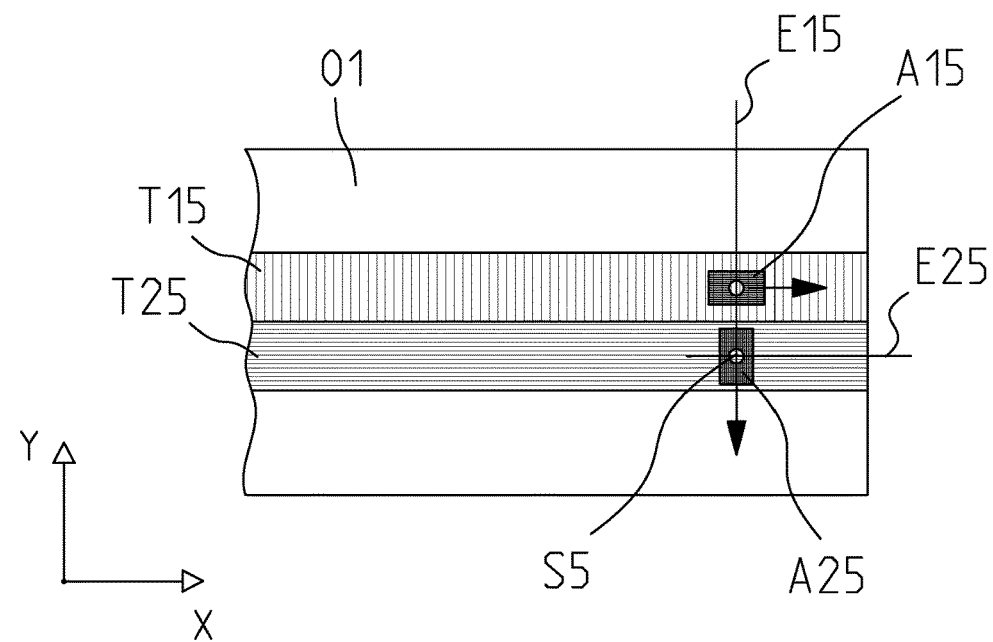
FIG. 5 shows an alternative embodiment of measuring graduations with scanning units associated therewith.

FIG. 5 illustrates an alternative embodiment. Here, the graduation lines of first measuring graduation T15 are also inclined with respect to the graduation lines of second measuring graduation T25 by an angle different from 0°, for example by 90°, but the graduation lines of first measuring graduation T15 are inclined with respect to the direction of feed X by 90°, and the graduation lines of second measuring graduation T25 extend parallel to the direction of feed X. In this example, the two planes E15 and E25 are obtained, which are perpendicular to surface O1 and intersect in axis of intersection S5.

The graduation lines of measuring graduations T11, T12, T13, T15, T21, T22, T23, T25 may be periodically arranged to form an incremental graduation, as illustrated in the previous examples.

The incremental graduation may be supplemented with a reference mark to establish an absolute position. In particular, a reference mark or reference marking may be incorporated into the incremental graduation.

Figure 6:
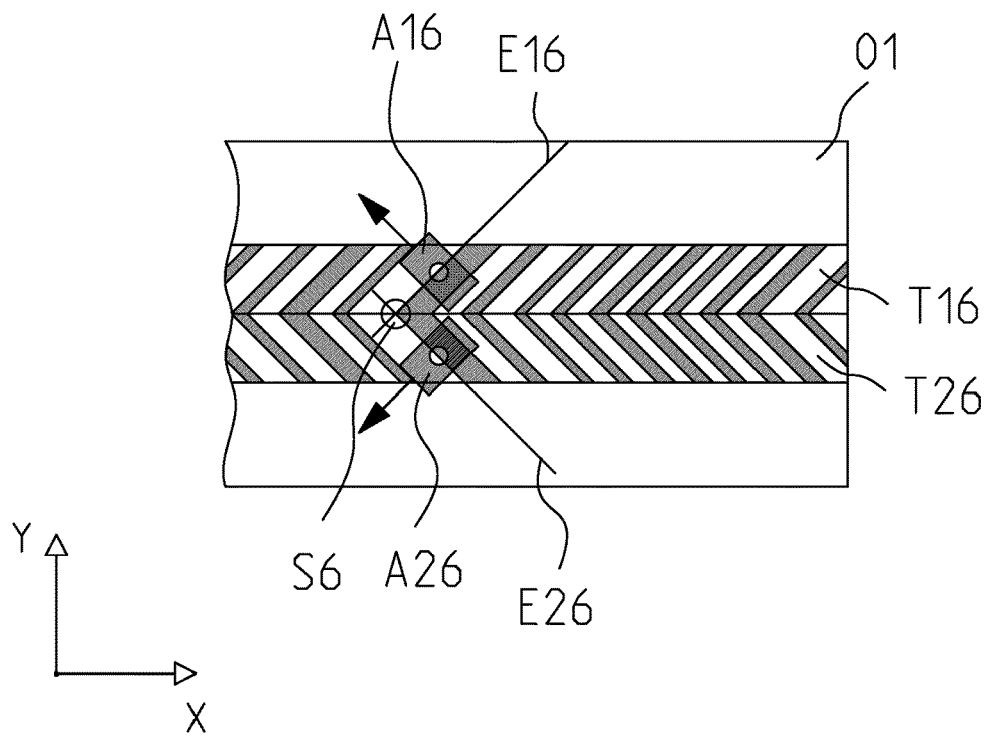
FIG. 6 shows an embodiment of the measurement graduations in the form of absolute graduations with scanning units associated therewith.

Alternatively, it is also possible to use measuring graduations T16, T26, whose graduation lines are arranged aperiodically, and which thus form absolute measuring graduations T16, T26. An example is shown in FIG. 6. Measuring graduation T16 is associated with a scanning unit A16, and measuring graduation T26 is associated with a scanning unit A26. Scanning units A16, A26 may be line sensors. Here, too, it holds that the graduation lines of absolute measuring graduation T16 are inclined with respect to the graduation lines of absolute measuring graduation T26. A first plane E16 normal to surface O1 and extending in the direction of the graduation lines of measuring graduation T16 through the scanning location of scanning unit A16 intersects a second plane E26 normal to surface O1 and extending in the direction of the graduation lines of measuring graduation T26 through the scanning location of scanning unit A26, thus forming an axis of intersection S6.

Another possible embodiment of a position-measuring device according to the invention will be described with reference to FIGS. 7 and 8. The basic design corresponds to the example already described with reference to FIGS. 1 through 4. Therefore, only the additional features will be discussed here, and the designations and reference numerals from FIGS. 1 through 4 will be used here as well to refer to corresponding parts.

This position-measuring device is enhanced over the first exemplary embodiment in that surface O4 of carrier body 1 also has scanning units A14, A24 associated therewith. Thus, in this advantageous embodiment, each of surfaces O1, O2, O3, O4 of carrier body 1 extending in the direction of feed X has the same number of scanning units A11 through A14, A21 through A24 associated therewith. Since scanning units A11 through A14, A21 through A24 have electrical components, they constitute heat sources. The fact that each of surfaces O1, O2, O3, O4 is associated with the same number of scanning units A11 through A14, A21 through A24 ensures a symmetrical heat input to both carrier body 1 and support 3.

The additional scanning units A14, A24 may be used to generate redundant information for measuring the six degrees of freedom. For this purpose, carrier body 1 may carry one or more measuring graduations also on surface O4, such as, for example, a first measuring graduation T14 and a second measuring graduation T24 inclined relative thereto.

Particularly advantageously, the graduation lines of measuring graduations T14, T24 are here also inclined with respect to one another in such a way, and the associated scanning units A14, A24 are disposed in such a way that the following condition applies: If a first plane E14 is passed through the scanning location of scanning unit A14 in the direction of the graduation lines of first measuring graduation T14 and perpendicularly to surface O4, and if a second plane E24 is passed through the scanning location of scanning unit A24 in the direction of the graduation lines of second measuring graduation T24 and perpendicularly to surface O4, then a common axis of intersection S4 is formed between these two planes E14, E24. This axis of intersection S4 also extends through point P.

In the previously described exemplary embodiments, the mutual inclination of the graduation lines of measuring graduations T11 through T14, T24 through T21, and the arrangement of scanning units A11 through A14, A21 through A24 were selected such that the common thermally neutral point P lies at the cross-sectional center of carrier body 1.

Figure 9:
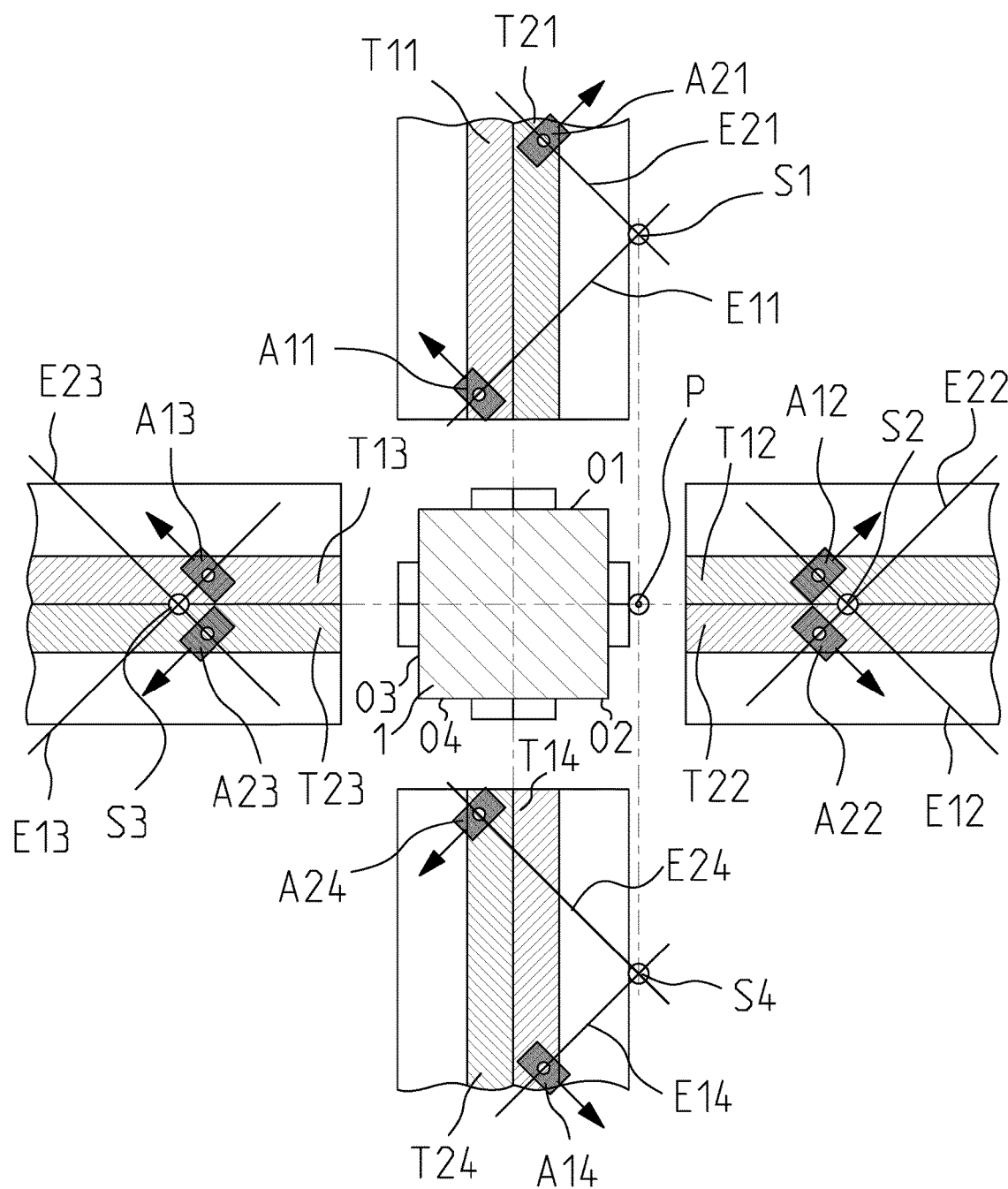
FIG. 9 shows a third exemplary embodiment of a position-measuring device according to the invention.

The position of the common thermally neutral point P may be selected as needed via the parameter of inclination of the graduation lines or selection of the sensitivity vector, as well as the parameter of arrangement of scanning units A11 through A14, A21 through A24. An example of this will be described with reference to FIG. 9.

Figure 7:
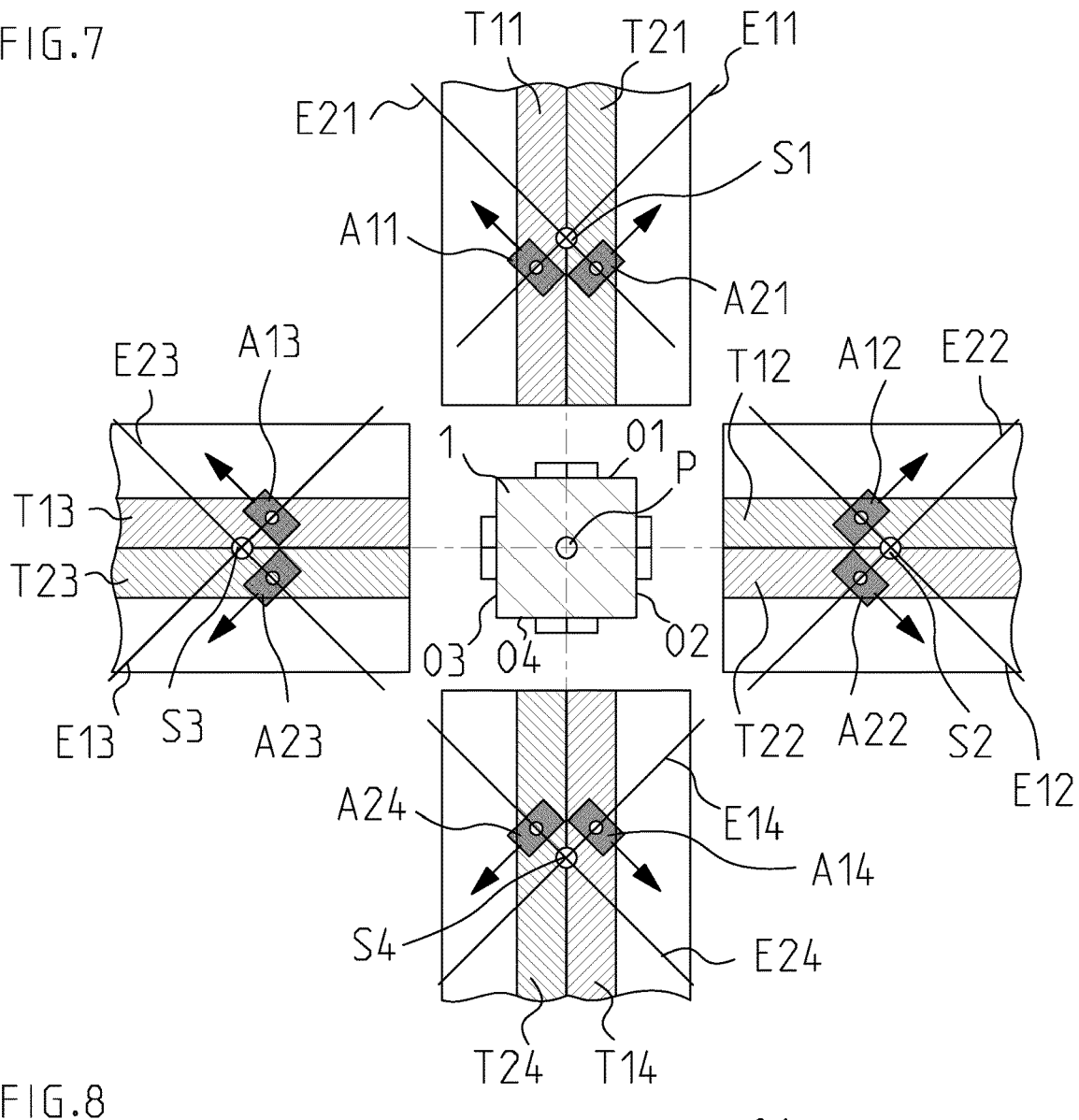
FIG. 7 shows a second exemplary embodiment of a position-measuring device according to the invention.
Figure 8:
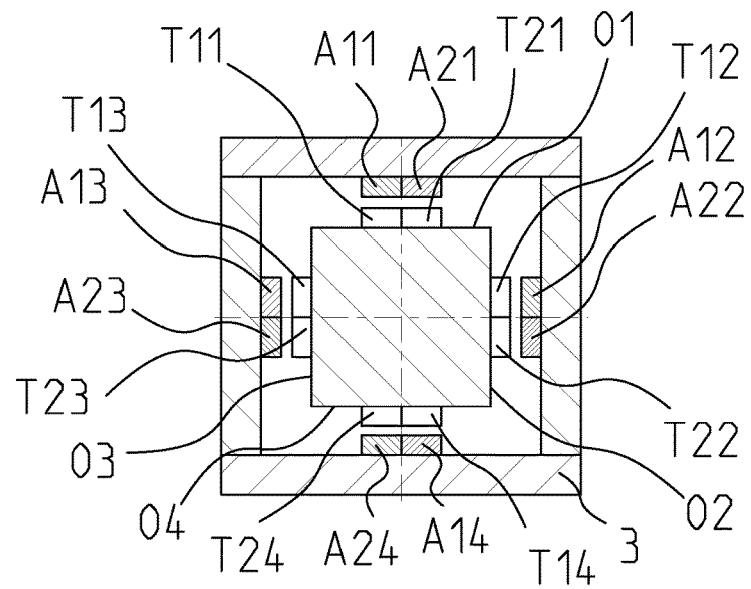
FIG. 8 shows a cross section of the carrier body of FIG. 7, illustrating a possible embodiment of the scanning assembly associated therewith.

Carrier body 1 and the measuring graduations T11 through T14, T21 through T24 provided thereon correspond to the exemplary embodiment of FIG. 7, to which reference is made.

In order to form a common thermally neutral point P outside of carrier body 1, measuring graduations T11 through T14, T24 through T21 and scanning units A11 through A14, A21 through A24 associated with measuring graduations T11 through T14, T21 through T24 are configured or arranged to satisfy the following conditions: If a first plane E11 is passed through the scanning location of scanning unit A11 in the direction of the graduation lines of first measuring graduation T11 and perpendicularly to surface O1, and if a second plane E21 is passed through the scanning location of scanning unit A21 in the direction of the graduation lines of second measuring graduation T21 and perpendicularly to surface O1, then a common axis of intersection S1 is formed between these two planes E11, E21. This axis of intersection S1 forms a thermally neutral axis for the scanning units A11, A12 associated with surface O1.

If a first plane E12 is passed through the scanning location of scanning unit A12 in the direction of the graduation lines of first measuring graduation T12 and perpendicularly to surface O2, and if a second plane E22 is passed through the scanning location of scanning unit A22 in the direction of the graduation lines of second measuring graduation T22 and perpendicularly to surface O2, then a common axis of intersection S2 is formed between these two planes E12, E22. This axis of intersection S2 forms a thermally neutral axis for the scanning units A12, A22 associated with surface O2.

If a first plane E13 is passed through the scanning location of scanning unit A13 in the direction of the graduation lines of first measuring graduation T13 and perpendicularly to surface O3, and if a second plane E23 is passed through the scanning location of scanning unit A23 in the direction of the graduation lines of second measuring graduation T23 and perpendicularly to surface O3, then a common axis of intersection S3 is formed between these two planes E13, E23. This axis of intersection S3 forms a thermally neutral axis for the scanning units A13, A23 associated with surface O3.

In accordance with an embodiment of the invention, the arrangement is selected such that the three axes of intersection S1, S2, S3 intersect at a common point P.

For optimized heat input, the position-measuring device in this example is supplemented with further scanning units A14, A24, which are arranged according to the following rule: If a first plane E14 is passed through the scanning location of scanning unit A14 in the direction of the graduation lines of first measuring graduation T14 and perpendicularly to surface O4, and if a second plane E24 is passed through the scanning location of scanning unit A24 in the direction of the graduation lines of second measuring graduation T24 and perpendicularly to surface O4, then a common axis of intersection S4 is formed between these two planes E14, E24. It is particularly advantageous here if this axis of intersection S4 also passes through point P.

As can be seen from the above examples, the spatial position of point P can be freely selected. This point P is the thermally neutral point (also called thermal center or fixed thermal reference point) to which the degrees of freedom to be measured are related. For example, point P may be selected to be at the location where support 3 is connected to the object to be measured, or it is selected to lie at the tool center point of a coordinate measuring machine or a machine tool.

A position-measuring device designed according to an embodiment of the invention may be used to measure guideway errors of a coordinate measuring machine or a machine tool. In such use, the position-measuring device may be associated with a guideway of the coordinate measuring machine or of the machine tool. However, a position-measuring device designed according to an embodiment of the invention may also itself function as a machine guideway. Thus, the carrier body may be configured, for example, as the quill of a coordinate measuring machine. If the carrier body carrying the measuring graduations serves as a guide element, it is advantageous if the measuring graduations are incorporated into the surface of the carrier body, in particular by partially treating the surface with laser radiation. The region of the measuring graduations may also function as a guide surface, in particular if the guideway is configured as an air bearing.

In particular, if a position-measuring device designed according to an embodiment of the invention is used in a machine tool, it may be advantageous for carrier body 1 and scanning assembly 2 to be accommodated in a housing. In this case, as is known from so-called sealed position-measuring systems, the housing may be covered by seals extending in the direction of feed X and having a driver dog for scanning assembly 2 extending therethrough.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A position-measuring device for measuring a relative position of two relatively movable objects in a direction of feed and in other degrees of freedom, the position-measuring device comprising:
a carrier body carrying measuring graduations and extending longitudinally in the direction of feed; and
a scanning assembly which is movable relative to the carrier body and includes a plurality of scanning units for scanning the measuring graduations,
wherein:
at least three surfaces of the carrier body each carry a first measuring graduation and a second measuring graduation, each of the first measuring graduations and the second measuring graduations having a series of graduation lines, and the graduation lines of the first measuring graduation being inclined with respect to the graduation lines of the second measuring graduation;
each of the first measuring graduations and each of the second measuring graduations is associated with at least one of the scanning units for scanning the respective measuring graduation at a scanning location such that, for each of the at least three surfaces, at least two of the scanning units are disposed for scanning the respective measuring graduations of the respective one of the surfaces, the at least two of the scanning units being disposed in each case in such a way, and the graduation lines of the two measuring graduations being inclined with respect to one another in each case in such a way, that two normal planes extending respectively in the direction of the respective graduation lines of the measuring graduations through the respective scanning locations of the at least two of the scanning units associated with a respective one of the surfaces have a common axis of intersection, whereby the three resulting axes of intersection extend through a common point.

2. The position-measuring device as recited in claim 1, wherein the at least three surfaces of the carrier body, the measuring graduations and the scanning units are arranged and adapted such that the position of the scanning assembly relative to the carrier body can be determined in six degrees of freedom.

3. The position-measuring device as recited in claim 1, wherein the carrier body is a prismatic body, and wherein the at least three surfaces are faces of the prismatic body.

4. The position-measuring device as recited in claim 3, wherein the carrier body is a rectangular parallelepiped.

5. The position-measuring device as recited in claim 1, wherein the common point lies at the cross-sectional center of the carrier body.

6. The position-measuring device as recited in claim 1, wherein the first measuring graduation and the second measuring graduation of each of the surfaces extend longitudinally along the direction of feed and are disposed adjacent to one another in a direction perpendicular to the direction of feed.

7. The position-measuring device as recited in claim 1, wherein the graduation lines of the first measuring graduation are inclined relative to the direction of feed by an angle different from 0°, and wherein the graduation lines of the second measuring graduation are also inclined relative to the direction of feed by an angle different from 0°.

8. The position-measuring device as recited in claim 7, wherein the graduation lines of the first measuring graduation and the graduation lines of the second measuring graduation are inclined relative to the direction of feed by the same angle in terms of absolute magnitude.

9. The position-measuring device as recited in claim 8, wherein the graduation lines of the first measuring graduation are inclined relative to the direction of feed by +45°, and wherein the graduation lines of the second measuring graduation are inclined relative to the direction of feed by −45°.

10. The position-measuring device as recited in claim 1, wherein the graduation lines of the first measuring graduation are inclined relative to the direction of feed by 90°.

11. The position-measuring device as recited in claim 1, wherein the measuring graduations are optically scannable.

12. The position-measuring device as recited in claim 1, wherein the measuring graduations are incremental graduations.

13. The position-measuring device as recited in claim 11, wherein the measuring graduations are incremental graduations, each of the measuring graduations having a reference mark pattern incorporated therein.

14. The position-measuring device as recited in claim 1, wherein the measuring graduations are absolute graduations.

15. The position-measuring device as recited in claim 1, wherein each of the surfaces of the carrier body extending in the direction of feed has the same number of scanning units associated therewith.

* * * * *